No. 805,761.  PATENTED NOV. 28, 1905.
E. R. TAYLOR.
TREAD PIECE FOR SIDEWALK LIGHTS, &c.
APPLICATION FILED FEB. 1, 1905.

Witnesses:
L. E. Kennedy
O. F. Batchelder

Inventor:
E. R. Taylor
By Wright Brown & Quinby
Attorneys.

UNITED STATES PATENT OFFICE.

EDGAR R. TAYLOR, OF BOSTON, MASSACHUSETTS.

TREAD-PIECE FOR SIDEWALK-LIGHTS, &c.

No. 805,761.          Specification of Letters Patent.          Patented Nov. 28, 1905.

Application filed February 1, 1905. Serial No. 243,696.

*To all whom it may concern:*

Be it known that I, EDGAR R. TAYLOR, of Boston, in the county of Suffolk and State of Massachusetts, have invented certain new and useful Improvements in Tread-Pieces for Sidewalk-Lights, &c., of which the following is a specification.

This invention relates to the type of sidewalk-lights or vault-covers which includes a grating the openings of which contain lenses to illuminate the space below, the lenses being secured by cement interposed between the lenses and supported by the grating. The upper surfaces of the lenses and the upper surface of the cement filling constitute the main part of the tread-surface, and to render this surface less slippery than it would be if it included only the glass and cement it is customary to introduce tread-pieces of antislipping material, such as lead, into the cement filling at points between the lenses.

My invention has for its object to provide a tread-piece of the character above mentioned adapted particularly for engagement with a grating comprising a series of tread-supporting bars and a series of intersecting bars the top surfaces of which are lower than the top surfaces of the said supporting-bars, the tread-piece of my invention being preferably cross-shaped and when in place projecting between the corners of the adjacent lenses in such manner that the tread-pieces collectively form extended areas of antislipping surface.

The invention consists in the improvements which I will now proceed to describe and claim.

Figure 1:
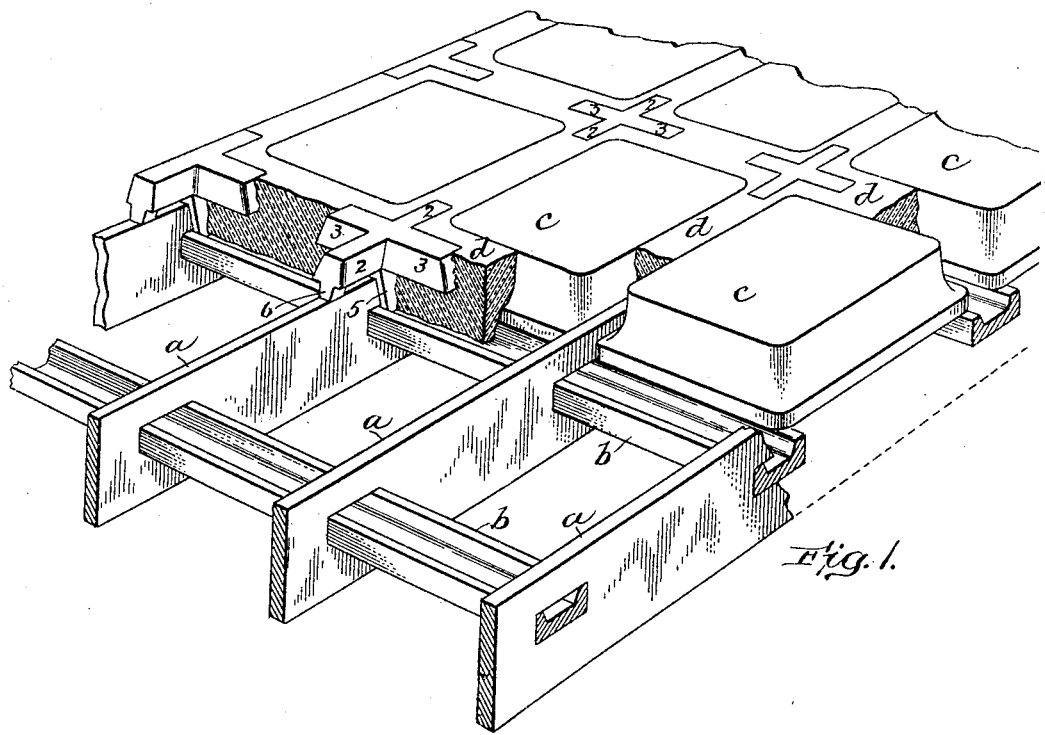
Figure 2:
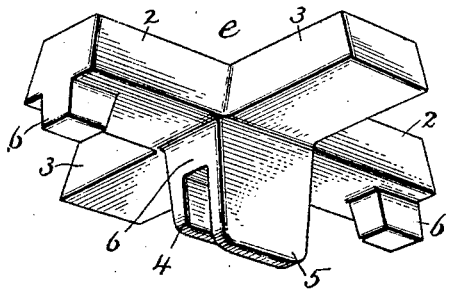
Figure 3:
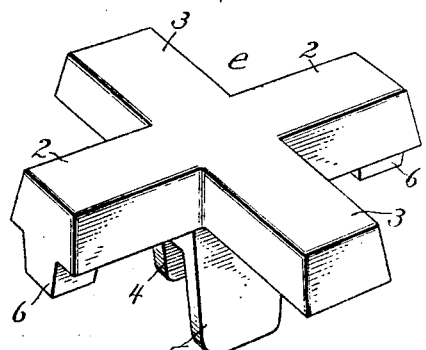

Of the accompanying drawings, forming a part of this specification, Figure 1 represents a perspective view showing portions of a sidewalk-light provided with my improved tread-piece. Figs. 2 and 3 represent perspective views of the tread-piece.

The same reference characters indicate the same parts in all the figures.

In the drawings, *a a* and *b b* represent two series of bars forming a grating. The bars *a* have slots in which the bars *b* are inserted, the upper edges of the bars *a* being higher than the upper surfaces of the bars *b*, the latter being grooved or recessed, as shown in Fig. 1. The grating above described forms a part of a well-known sidewalk-light, which is not of my invention. Said light includes lenses *c*, formed to enter the spaces between the bars *a* and to rest upon the raised edges of the bars *b*, and cement fillings *d*, interposed between the side edges of the lenses and supported by the bars *a* and *b*.

The tread-piece which I have here shown as embodying my invention is adapted particularly for application to the grating above described, said tread-piece being formed to be seated on the top edges of the bars *a* and provided with means for engaging the sides of the bars *a* to prevent horizontal displacement of the tread-pieces crosswise of said bars and also with means for engaging the bars *b* to prevent horizontal displacement of the tread-pieces lengthwise of the said bars *b*, provision being thus made for interlocking the tread-pieces with the bars *a* and *b* before the application of the cement, so that the tread-pieces cannot be displaced in any direction by the operation of applying the cement.

*e* represents my improved tread-piece, which may be composed of any suitable antislipping material, preferably lead, and is preferably cross-shaped. The arms 2 2 of the tread-piece are formed to be seated upon the upper edge of one of the bars *a*, said arms and the intermediate portion of the tread-piece constituting what I call the "body" of the tread-piece, the other arms 3 3 being considered as wings projecting from opposite sides of the body.

4 5 represent ears which project downwardly from the body of the tread-piece and are formed to bear upon opposite sides of the tread-supporting bar *a*, and thus prevent the tread-piece from being displaced in a direction at right angles to the bar *a*. The ear 5 is adapted to engage one of the grating-bars *b* by entering the grooved upper surface of said bar, and thus preventing horizontal displacement of the tread-piece in a direction at right angles to the bar *b*.

It will be seen that the described engagement of the tread-piece with the bars *a* and *b* is such that horizontal displacement of the tread-piece in any direction is impossible. The tread-pieces may therefore be applied to the grating-bars before the application of the cement, the latter being filled in between the arms of the tread-pieces and the adjacent edges of the lenses without any tendency to displace the tread-pieces. Portions of the tread-piece have practically a side engagement with both of the intersecting bars. The inner faces of the ears 4 5 engage the sides of the tread-supporting bar *a*, and one or both of said ears are of a length greater than the height of said bar *a* above the uppermost part of the intersecting bar *b*, said ear extending down so as to engage the inner side of the rib or ribs forming the walls of the groove in said bar *b*, as clearly shown in Fig. 1.

It will be observed that the ear 5, which engages the grooved cross-bar *b*, coincides with the arms 3 3 of the tread-piece, so that said arms are held directly over the bar *b*, and therefore equidistant from the ends of the lenses which bear upon said bar. The ears 4 and 5 coöperate in like manner in holding the body portion of the tread-piece directly over the bar *a*, the sides of the arms 2 being therefore equidistant from the adjacent sides of the lenses.

For the sake of economy of material I provide the body portion of the tread-piece with feet or projections 6, which bear upon the bar *a*.

It will be seen that the arms 2 and 3 of the tread-piece project between the adjacent edges of the lenses and guard the corner portions of said lenses, as clearly shown in Fig. 1.

I do not limit myself to a tread-piece formed for engagement with the particular form of grating shown in Fig. 1, as the tread-piece may be adapted for simultaneous engagement with two intersecting bars otherwise formed and connected.

I claim—

1. The combination with a grating composed of intersecting bars, one of said bars being grooved or recessed and the upper edge of the intersecting bar being in a plane above the plane of the grooved bar, of a tread-piece composed of a body formed to be seated on the upper bar and having ears projecting downwardly on opposite sides of the tread-piece-supporting bar, one or both of said ears entering the grooved upper surface of the other bar, whereby said tread-piece is engaged with both of said bars to prevent lateral displacement in any direction.

2. For application to a grating comprising a series of tread-supporting bars, and a series of intersecting bars the top surfaces of which are grooved and are lower than the top surfaces of the supporting-bars, a tread-piece formed to be seated on one of the supporting-bars and having downwardly-projecting ears adapted to bear on the sides of said bar, one of said ears being longer than the other to engage the groove of one of the lower bars, said ear being of a length greater than the height of the top surface of the supporting-bar above the uppermost part of the lower or intersecting bar.

In testimony whereof I have affixed my signature in presence of two witnesses.

EDGAR R. TAYLOR.

Witnesses:
C. F. BROWN,
E. BATCHELDER.